(12) United States Patent
Wang et al.

(10) Patent No.: US 11,501,668 B2
(45) Date of Patent: Nov. 15, 2022

(54) DISPLAY DEVICE

(71) Applicant: Samsung Display Co., Ltd., Yongin-si (KR)

(72) Inventors: Ji Young Wang, Hwaseong-si (KR); Dong Su Yee, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/930,333

(22) Filed: Jul. 16, 2020

(65) Prior Publication Data

US 2021/0090475 A1   Mar. 25, 2021

(30) Foreign Application Priority Data

Sep. 24, 2019  (KR) .................. 10-2019-0117323

(51) Int. Cl.
*G06F 1/16* (2006.01)
*G09F 9/30* (2006.01)

(52) U.S. Cl.
CPC ............ *G09F 9/301* (2013.01); *G06F 1/1616* (2013.01); *G06F 1/1626* (2013.01); *G06F 1/1656* (2013.01)

(58) Field of Classification Search
CPC .... G06F 1/1616; G06F 1/1626; G06F 1/1652; G06F 1/1656; G06F 1/1681
See application file for complete search history.

(56) References Cited

U.S. PATENT DOCUMENTS

| | | | |
|---|---|---|---|
| 9,119,316 B2 | 8/2015 | Lee | |
| 9,232,571 B2 | 1/2016 | Ahn et al. | |
| 9,295,168 B2 | 3/2016 | Baek et al. | |
| 9,348,362 B2 * | 5/2016 | Ko | G06F 1/1652 |
| 10,013,028 B2 * | 7/2018 | Ahn | G06F 1/1652 |
| 10,185,367 B2 * | 1/2019 | Kim | G06F 1/1675 |
| 10,383,239 B2 * | 8/2019 | Lee | H05K 5/0017 |
| 11,099,607 B2 * | 8/2021 | Kim | B32B 27/28 |
| 11,132,027 B2 * | 9/2021 | Park | H04M 1/0216 |
| 11,175,693 B2 * | 11/2021 | Song | G09G 3/3208 |
| 2010/0144406 A1 * | 6/2010 | Ozawa | G06F 1/1681 |
| | | | 361/749 |
| 2012/0307423 A1 * | 12/2012 | Bohn | H04M 1/0216 |
| | | | 361/679.01 |
| 2012/0307472 A1 * | 12/2012 | Bohn | G06F 1/1652 |
| | | | 361/807 |
| 2017/0142847 A1 * | 5/2017 | Park | G06F 1/1681 |
| 2017/0192462 A1 * | 7/2017 | Kim | B32B 27/38 |
| 2018/0124931 A1 * | 5/2018 | Choi | G09F 9/301 |
| 2018/0192527 A1 * | 7/2018 | Yun | G06F 1/1652 |
| 2019/0261524 A1 * | 8/2019 | Choi | H05K 5/0226 |
| 2020/0051881 A1 * | 2/2020 | Park | B32B 15/095 |
| 2020/0204666 A1 * | 6/2020 | Hong | G06F 1/1616 |
| 2021/0201710 A1 * | 7/2021 | Kim | G09F 9/301 |

FOREIGN PATENT DOCUMENTS

| | | |
|---|---|---|
| KR | 10-2018-0097195 | 8/2018 |
| KR | 10-1911047 | 10/2018 |
| KR | 10-1903053 | 11/2018 |
| KR | 10-1940104 | 1/2019 |

* cited by examiner

*Primary Examiner* — Anthony Q Edwards
(74) *Attorney, Agent, or Firm* — H.C. Park & Associates, PLC

(57) ABSTRACT

A display device includes: a display panel having a foldable area; and a support disposed on a bottom surface of the display panel, the support including a plurality of projections spaced apart from each other in the foldable area and being inclined relative to the bottom surface.

16 Claims, 10 Drawing Sheets

DISPLAY DEVICE

CROSS-REFERENCE TO RELATED APPLICATION

This application claims priority from and the benefit of Korean Patent Application No. 10-2019-0117323 filed on Sep. 24, 2019, which is hereby incorporated by reference for all purposes as if fully set forth herein.

BACKGROUND

Field

Exemplary implementations of the invention relate generally to a display device and, more particularly, to a foldable display device.

Discussion of the Background

Flat panel display devices are used as display devices for replacing a cathode ray tube display device due to their lightweight and thin characteristics. Representative examples of such flat panel display devices are a liquid crystal display device and an organic light emitting diode display device.

Recently, a flexible display device has been developed in which a lower substrate and an upper substrate of a display panel included the display device have a flexible material so a portion of the display panel may be bent or folded. For example, the lower substrate included in the display panel may be formed of a polyimide substrate, and the upper substrate included in the display panel may have a thin film encapsulation structure. In addition, the flexible display device may display an image even in a portion where the display panel is folded. In other words, the flexible display device may include a display area in which an image is displayed, and a portion of the display area may be folded. The flexible display device may further include a support member disposed on a bottom surface of the display panel and including a plurality of support patterns. The support patterns of the support member may overlap the portion where the display panel is folded. However, deformations such as creases in the support pattern may be visually recognized when the flexible display device is unfolded. In addition, when the flexible display device is repeatedly folded and unfolded, the support pattern may be broken.

The above information disclosed in this Background section is only for understanding of the background of the inventive concepts, and, therefore, it may contain information that does not constitute prior art

SUMMARY

Foldable display devices constructed according to the principles and exemplary implementations of the invention are capable of being repeatedly folded and unfolded without deformations in a support being visible or broken. For example, the support may include projections inclined at one or more predetermined angles, so that when the display device is unfolded, the support patterns may not be visually recognized.

In some exemplary implementations, the support may be a support member and the projections may be support patterns formed in the support member. The support patterns may be inclined at the same angle or include a reference support pattern, inclination support patterns inclined at a first angle, and reverse inclination support patterns inclined at a second angle.

Additional features of the inventive concepts will be set forth in the description which follows, and in part will be apparent from the description, or may be learned by practice of the inventive concepts.

According to one aspect of the invention, a display device includes: a display panel having a foldable area; and a support disposed on a bottom surface of the display panel, the support including a plurality of projections spaced apart from each other in the foldable area and being inclined relative to the bottom surface.

The display panel may further include a display area, and a portion of the display area may be defined as the foldable area.

The first adhesive member may be disposed on a bottom surface of the support, the first adhesive member having an opening overlapping the foldable area.

The projections may include support patterns inclined at one or more predetermined angles to block external light incident through the opening of the first adhesive member.

The support may include a support member having openings defined by spaces between the projections.

The openings may define an empty space.

Each of the projections may include support patterns including a first side surface, a top surface adjacent to a first portion of the first side surface, and a bottom surface adjacent to a second portion opposite to the first portion of the first side surface, and the support patterns may include a first support pattern having a top surface and a second support pattern having a bottom surface, in which the first and second support patterns may overlap two adjacent support patterns.

The support may include a support member and the projections may include support patterns formed in the support member including first to $n^{th}$ support patterns (where n is an integer of 1 or more) arranged in a first direction generally parallel to a top surface of the display panel, each of the first to $n^{th}$ support patterns may include a first side surface, a top surface adjacent to a first portion of the first side surface, and a bottom surface adjacent to a second portion opposite to the first portion of the first side surface; and the top surface of a $k^{th}$ support pattern (where k is an integer between 1 and n) and the bottom surface of a $(k+1)^{th}$ support pattern of the first to $n^{th}$ support patterns may overlap each other.

The inner side surface of the support member adjacent to the first side surface of the first support pattern may be generally parallel to the first side surface of the first support pattern.

The support member may include first to $m^{th}$ openings (where m is an integer of 1 or more) arranged in the first direction generally parallel to the top surface of the display panel; a $j^{th}$ opening (where j is an even number between 1 and m) of the first to $m^{th}$ openings may be shifted in a second direction generally perpendicular to the first direction; and one of the support patterns may be located in a third direction opposite to the second direction from each of $(j-1)^{th}$ and $(j+1)^{th}$ openings of the first to $m^{th}$ openings.

The projections may include support patterns, each of the support patterns may include a first side surface, a top surface adjacent to a first portion of the first side surface, a bottom surface adjacent to a second portion opposite to the first portion of the first side surface, and a second side surface facing the first side surface, and the support patterns may include: a first support pattern; second support patterns inclined at a first angle relative to the first side surface of the first support pattern; and third support patterns inclined at a second angle different from the first angle relative to the second side surface of the first pattern.

The first support pattern may include a reference support pattern, the second support patterns may include inclination support patterns, and the third support patterns may include reverse inclination support patterns, and the inclination support patterns and the reverse inclination support patterns may be generally symmetrical to each other relative to the reference support pattern.

The support may include a support member and the projections may include support patterns formed in the support member including first to $n^{th}$ support patterns (where n is an integer of 1 or more) arranged in a first direction generally parallel to a top surface of the display panel, each of the first to $n^{th}$ support patterns may include a first side surface, a top surface adjacent to a first portion of the first side surface, a bottom surface adjacent to a second portion opposite to the first portion of the first side surface, and a second side surface facing the first side surface, and a $k^{th}$ support pattern (where k is an integer between 1 and n) of the first to $n^{th}$ support patterns may be defined as a reference support pattern, first to $(k-1)^{th}$ support patterns may be defined as inclination support patterns inclined at a first angle on the first side surface of the reference support pattern, and $(k+1)^{th}$ to $n^{th}$ support patterns may be defined as reverse inclination support patterns inclined at a second angle different from the first angle relative to the second side surface of the reference support pattern.

The first to $(k-1)^{th}$ support patterns and the $(k+1)^{th}$ to $n^{th}$ support patterns may be generally symmetrical to each other based on the $k^{th}$ support pattern.

The first inner side surface of the support member adjacent to the first side surface of the first support pattern may be generally parallel to the first side surface of the first support pattern, and a second inner side surface of the support member, which may be adjacent to the second side surface of the $n^{th}$ support pattern and may face the first inner side surface of the support member, may be generally parallel to the second side surface of the $n^{th}$ support pattern.

The support member may include first to $m^{th}$ openings (where m is an integer of 1 or more) arranged in the first direction generally parallel to the top surface of the display panel, a $j^{th}$ opening (where j is an even number between 1 and m) of the first to $m^{th}$ openings may be shifted in a second direction generally perpendicular to the first direction, and one of the support patterns may be located in a third direction opposite to the second direction from each of $(j-1)^{th}$ and $(j+1)^{th}$ openings of the first to $m^{th}$ openings.

The flexible member may be disposed between the support and the display panel.

The flexible member may include a shock absorbing member and further including a second adhesive member disposed between the shock absorbing member and the support, wherein the second adhesive member may be in direct contact with the shock absorbing member and the support.

The lower protective film may be disposed between the flexible member and the display panel.

The window member may be disposed on the display panel; and the protective film may be disposed on the window member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
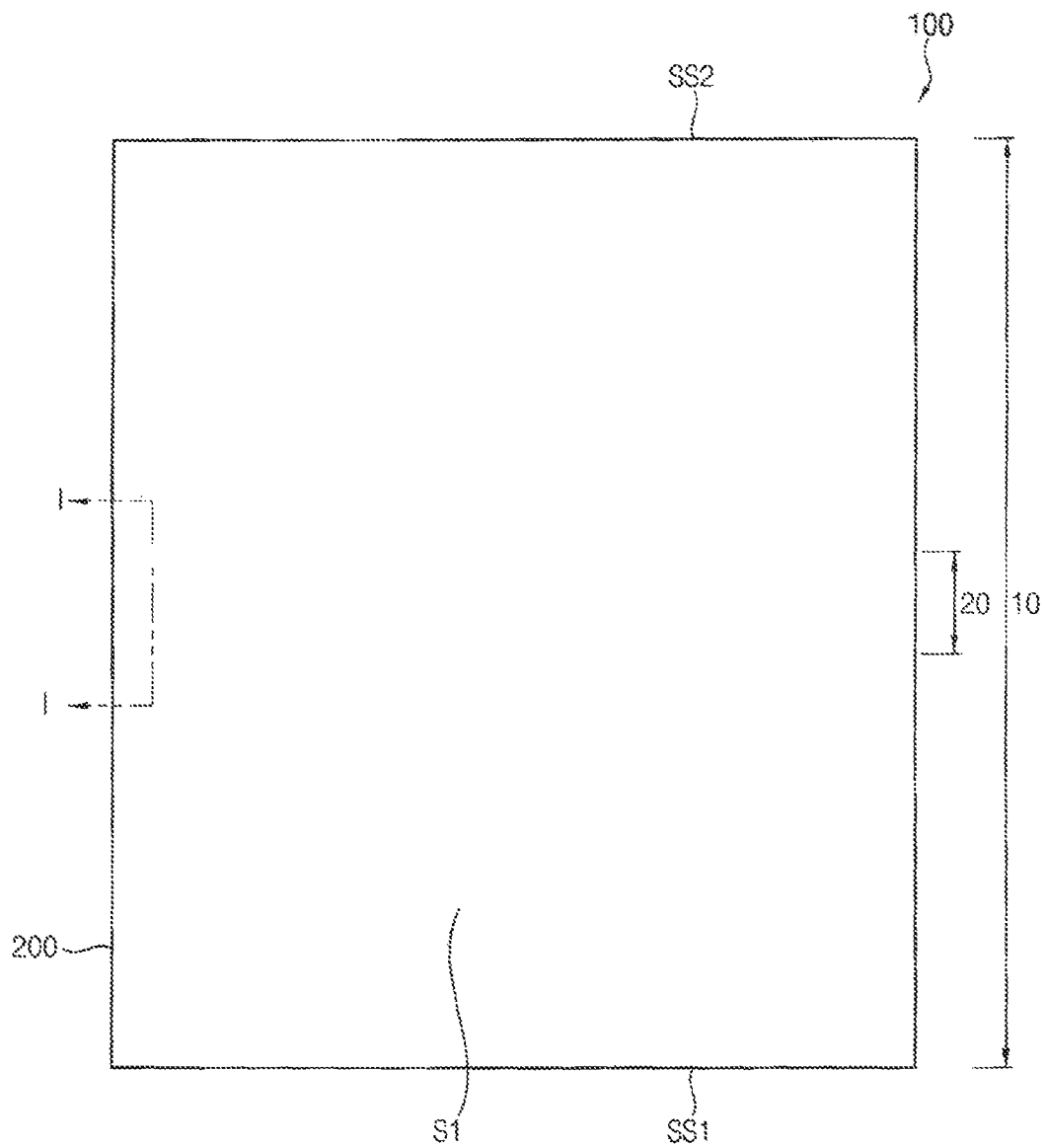
FIG. 1 is a plan view of an exemplary embodiment of a display device constructed according to principles of the invention in an unfolded position.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
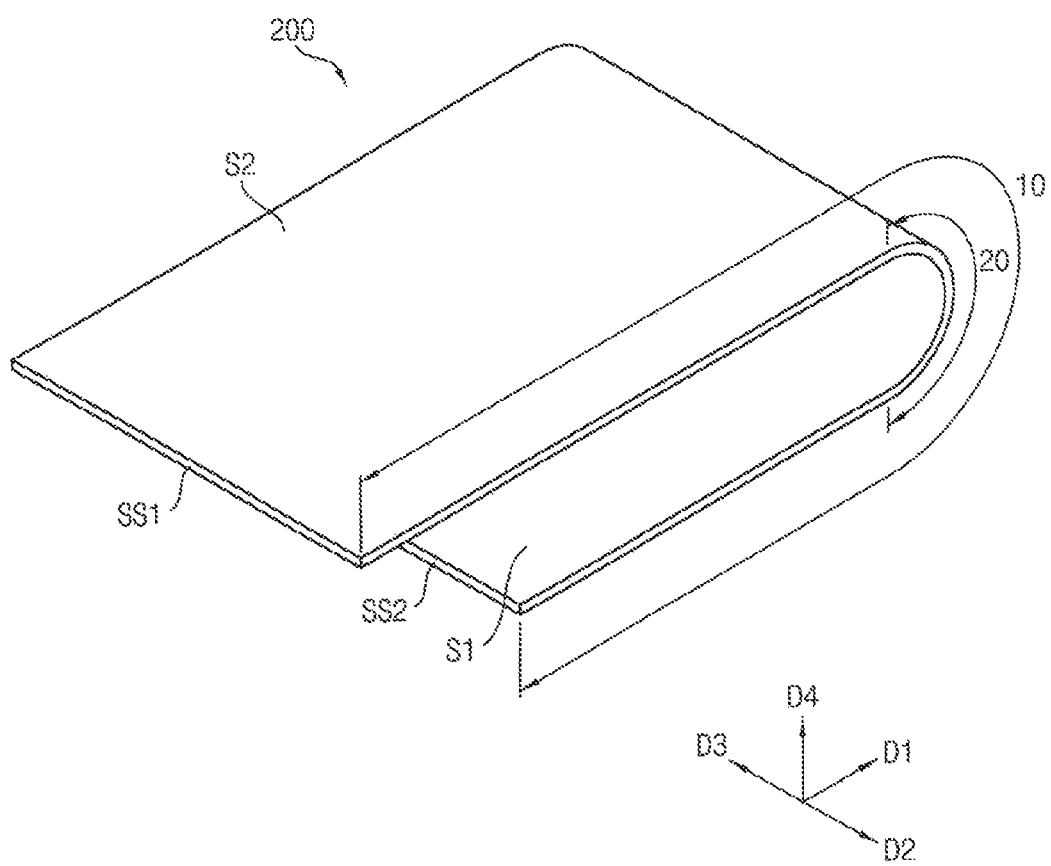
FIG. 2 is a perspective view of the display panel of the display device of FIG. 1 in a folded position.
Figure 3:
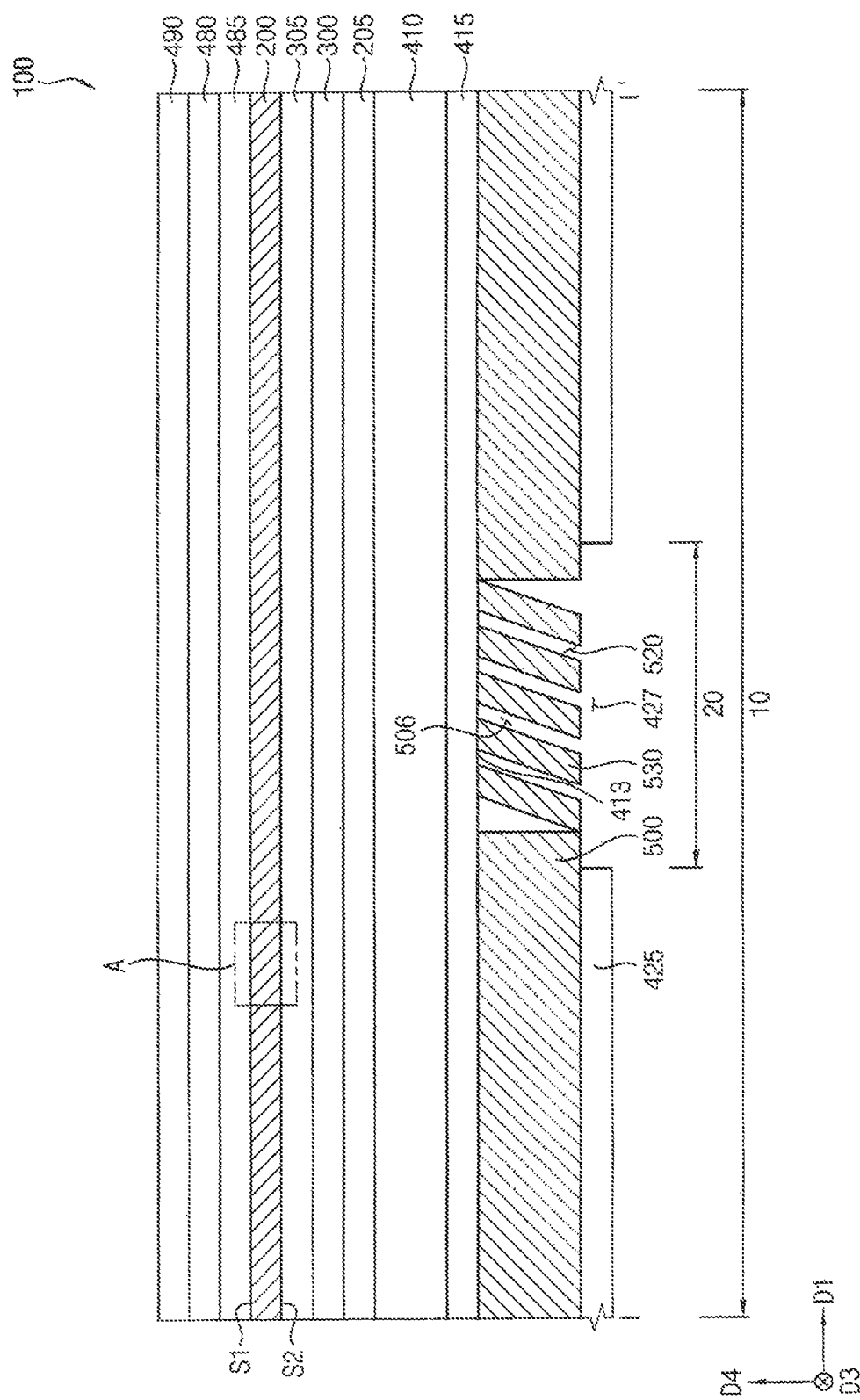
FIG. 3 is a cross-sectional view taken along line I-I' of FIG. 1.
Figure 4:
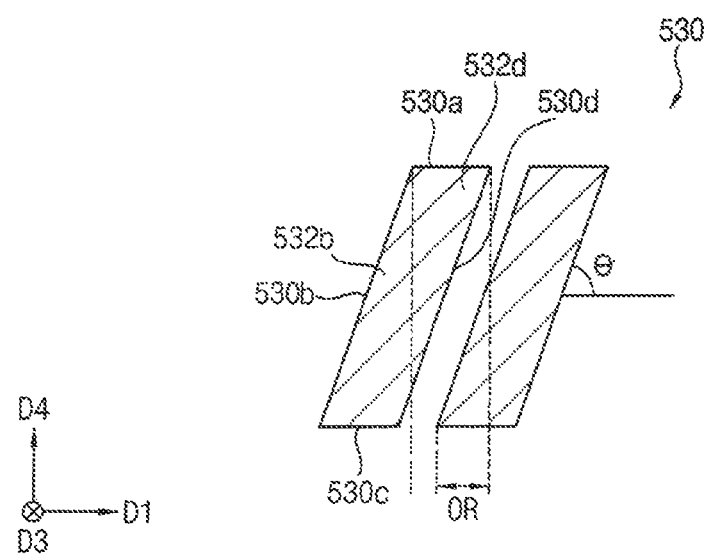
FIG. 4 is a cross-sectional view of an exemplary support pattern that may be included in the display device of FIG. 3.

FIG. 1 is a plan view of an exemplary embodiment of a display device constructed according to principles of the invention in an unfolded position. FIG. 2 is a perspective view of the display panel of the display device of FIG. 1 in a folded position. FIG. 3 is a cross-sectional view taken along line I-I' of FIG. 1. FIG. 4 is a cross-sectional view of an exemplary support pattern that may be included in the display device of FIG. 3.

Referring to FIGS. 1, 2, 3, and 4, the display device 100 may include a display panel 200, a flexible member in the form of a shock absorbing member 410, a support in the form of a support member 500, a lower protective film 300, a window member 480, a protective film 490, a first adhesive member 425, a second adhesive member 415, a third adhesive member 205, a fourth adhesive member 305, a fifth adhesive member 485, and the like.

The display panel 200 may include a display area 10 and a folding area 20. A plurality of pixels may be disposed in the display area 10, and an image may be displayed in the display area 10 through the pixels. For example, the display panel 200 may have a top or first surface S1 on which an image is displayed and a second surface S2 facing the first surface S1. In addition, the display panel 200 may have a first side surface SS1 and a second side surface SS2 facing the first side surface SS1. The folding area 20 may be an area in which the display panel 200 is folded or unfolded. A portion 20 of the display area 10 may be defined as the folding area 20.

When the display panel 200 located in the folding area 20 is folded, the first side surface SS1 and the second side surface SS2 may be adjacent to each other. In addition, the display panel 200 located in the folding area 20 may have a generally curved shape. In this case, the first surface S1 may be located on an inner side, and the second surface S2 may be located on an outer side. Alternatively, the display panel 200 may be folded such that the first surface S1 is located on the outer side and the second surface S2 is located on the inner side.

Although the display panel 200 has been described as having a generally rectangular shape when viewed in a plan view, the shape of the display panel 200 is not limited thereto. For example, the display panel 200 may have a generally triangular shape, a generally rhombical shape, a generally polygonal shape, a generally circular shape, a generally hollow elliptical shape, or a generally elliptical shape when viewed in a plan view.

In addition, as shown in FIG. 3, the support member 500 may include a plurality of projections, which may be in the form of support patterns 530 disposed in the folding area 20, and the support patterns 530 may be spaced apart from each other. In the illustrated exemplary embodiment, openings 520 of the support member 500 may be defined by spaces between the support patterns 530. Furthermore, the first adhesive member 425 may have an opening 427 which overlaps the folding area 20.

Referring again to FIGS. 1, 2, 3, and 4 as the folding area 20 of the display panel 200 is folded or unfolded, the display device 100 may be folded or unfolded in the folding area 20.

The support member 500 may be disposed on a bottom surface S2 of the display panel 200. In other words, the support member 500 may be disposed on the second surface S2 of the display panel 200, and may include a plurality of support patterns 530 formed in the folding area 20. In some exemplary embodiments, the support patterns 530 may be spaced apart from each other in a first direction D1, which is generally parallel to a top surface S1 of the display panel 200, in the folding area 20, and may be inclined at a predetermined angle θ. In addition, the support patterns 530 may extend in a second direction D2 or a third direction D3, which is generally perpendicular to the first direction D1.

As shown in FIG. 4, each of the support patterns 530 may include a first side surface 530b, a top surface 530a adjacent to a first portion 532b of the first side surface 530b, a bottom surface 530c adjacent to a second portion 532d opposite to the first portion 532b of the first side surface 530b (or a bottom surface 530c facing the top surface 530a), and a second side surface 530d facing the first side surface 530b. The top surface 530a of the first support pattern 530 and the bottom surface 530c of the second support pattern 530 of two adjacent support patterns 530 may overlap each other (e.g., overlap in a thickness direction or in a fourth direction D4 perpendicular to the first, second, and third directions D1, D2, and D3), and the overlapping portion may be defined as an overlapping region OR. When the bottom surface 530c of the second support pattern 530 overlaps the first portion 532b of the first side surface 530b and the top surface 530a of the first support pattern 530, the overlapping region OR may be relatively increased. In this case, external light may be further prevented from penetrating through the openings 520 in the fourth direction D4.

For example, the support patterns 530 may include first to $n^{th}$ support patterns 530 (where n is an integer of 1 or more) arranged in the first direction D1, each of the first to $n^{th}$ support patterns 530 may include the first side surface 530b, the top surface 530a, the bottom surface 530c, and the second side surface 530d, and the top surface 530a of a $k^{th}$ support pattern 530 (where k is an integer between 1 and n) and the bottom surface 530c of a $(k+1)^{th}$ support pattern 530 among the first to $n^{th}$ support patterns 530 may overlap each other.

The support patterns 530 may be inclined at a predetermined angle θ to block external light incident through the opening 427 of the first adhesive member 425. In other words, the support patterns 530 are inclined at the predetermined angle θ, so that a bottom surface 413 of the second adhesive member 415 may not be exposed through the openings 520 of the support member 500 in a direction from the support member 500 to the display panel 200 (e.g., in the fourth direction D4).

For example, the support member 500 included in the display device 100 may include support patterns 530 that are not inclined at a predetermined angle θ, and the support patterns 530 may be spaced apart from each other in the first direction D1. An opening 506 of the support member 500 may be defined by a space between the support patterns 530. The opening 506 may be exposed in the fourth direction D4, and the bottom surface 413 of the adhesive member 415 disposed on the support member 500 may be exposed through the opening 506. In this case, external light may penetrate in the fourth direction D4 through the opening 506, and shapes of the support patterns 530 may be visually recognized on the first surface S1 of the display panel by the external light.

In some exemplary embodiments of the invention, the display device 100 may include the support member 500 including the support patterns 530 inclined at the predetermined angle θ. The support patterns 530 have the predetermined angle θ, so that the bottom surface 413 of the second adhesive member 415 may not be exposed through the openings 520 of the support member 500, and the external light may not penetrate in the direction D4. Accordingly, when the display device 100 is unfolded, the shapes of the support patterns 530 may not be visually recognized on the first surface S1 of the display panel 200.

Although the support patterns 530 and the support member 500 have been shown in FIG. 3 as being separated from each other, in other sectional views of the display device 100 located in the folding area 20, the support patterns 530 may be connected to the support member 500 located on left and right sides of the support patterns 530. In other words, the openings 520 may be defined by the support patterns 530, and the support patterns 530 and the support member 500 located on the left and right sides of the support patterns 530 may be integrally formed.

In other exemplary embodiments, in other sectional views of the display device 100 located in the folding area 20, positions of the openings 520 of the support member 500 may be changed (e.g., shifted in the first direction D1), and positions of the support patterns 530 may also be changed (e.g., shifted in the first direction D1) as the positions of the openings 520 are changed. In this case, in the above other sectional views, the number of the openings 520 and the number of the support patterns 530 may be changed (see FIG. 9).

The support member 500 may serve to support the display panel 200, and may also serve to assist folding of the display panel 200. For example, the support member 500 may be disposed over the second surface S2 of the display panel 200 to support the display panel 200, and the openings 520 formed in the folding area 20 may assist the display panel 200 by providing flexibility so that the display panel 200 may be folded. In addition, the openings 520 formed in the folding area 20 may prevent creases from being generated on the first surface S1 located in the folding area 20 of the display panel 200 by repeatedly folding and unfolding the display panel 200.

In some exemplary embodiments, the openings 520 may be configured as an empty space. In addition, when the display device 100 is folded and unfolded, each of the openings 520 may have a deformed shape. For example, since each of the openings 520 has a geometric shape, the support member 500 located in the folding area 20 may be deformed in a longitudinal direction (e.g., the first direction D1) without being deformed in the fourth direction D4.

The support member 500 may include a metal or a plastic having a relatively large elastic force or a relatively large restoring force. In the exemplary embodiments, the support member 500 may include steel use stainless (SUS). In some exemplary embodiments, the support member 500 may include one or more alloys (e.g., superelastic metals) of a nickel-titanium (Ni—Ti), a nickel-aluminum (Ni—Al), a copper-zinc-nickel (Cu—Zn—Ni), a copper-aluminum-nickel (Cu—Al—Ni), a copper-aluminum-manganese (Cu—Al—Mn), a titanium-nickel-copper-molybdenum (Ti—Ni—Cu—Mo), a cobalt-nickel-gallium:iron (Co—Ni—Ga:Fe), a silver-nickel (Ag—Ni), a gold-cadmium (Au—Cd), an iron-platinum (Fe—Pt), an iron-nickel (Fe—Ni), and an indium-cadmium (In—Cd). In other exemplary embodiments, the support member 500 may include a metal, an alloy, a metal nitride, a conductive metal oxide, a transparent conductive material, etc. For example, the support member 500 may include gold (Au), silver (Ag), aluminum (Al), tungsten (W), copper (Cu), platinum (Pt), nickel (Ni), titanium (Ti), palladium (Pd), magnesium (Mg), calcium (Ca), lithium (Li), chromium (Cr), tantalum (Ta), molybdenum (Mo), scandium (Sc), neodymium (Nd), iridium (Ir), an aluminum-containing alloy, an aluminum nitride ($AlN_x$), a silver-containing alloy, a tungsten nitride ($WN_x$), a copper-containing alloy, a molybdenum-containing alloy, a titanium nitride ($TiN_x$), a chromium nitride ($CrN_x$), a tantalum nitride ($TaN_x$), a strontium ruthenium oxide ($SrRu_xO_y$), a zinc oxide ($ZnO_x$), an indium tin oxide (ITO), a tin oxide ($SnO_x$), an indium oxide ($InO_x$), a gallium oxide ($GaO_x$), an indium zinc oxide (IZO), etc., which may be used alone or in combination with each other.

The first adhesive member 425 may be disposed on a bottom surface of the support member 500. A top surface of the first adhesive member 425 may be in direct contact with the support member 500, and the bottom surface of the first adhesive member 425 may be in contact with an optional set member surrounding the display device 100. In some exemplary embodiments, the first adhesive member 425 may have an opening 427 which overlaps the openings 520. In other words, the opening 427 may overlap the folding area 20. The first adhesive member 425 may adhere to the set member onto the bottom surface of the support member 500 except for the folding area 20. The first adhesive member 425 may not be disposed inside each of the openings 520 so that the openings 520 may be configured as empty spaces. In addition, when the display device 100 is folded and unfolded, the shape of each of the openings 520 may be deformed, and the shape of each of the openings 520 may be easily deformed because the first adhesive member 425 includes the first opening 427. Accordingly, the display device 100 may be easily folded and unfolded.

The first adhesive member 425 may include an optical clear adhesive (OCA), a pressure sensitive adhesive (PSA), a photocurable resin, a thermosetting resin, or the like. For example, the adhesive may include a polyethylene terephthalate (PET), a polyethylene naphthalene (PEN), a polypropylene (PP), a polycarbonate (PC), a polystyrene (PS), a polysulfone (PSul), a polyethylene (PE), a polyphthalamide (PPA), a polyether sulfone (PES), a polyarylate (PAR), a polycarbonate oxide (PCO), a modified polyphenylene oxide (MPPO), and the like, and the resin may include an epoxy resin, an amino resin, a phenol resin, a urea resin, a melamine resin, an unsaturated polyester resin, a polyurethane resin, a polyimide resin, and the like.

The shock absorbing member 410 may be disposed on the second surface S2 of the display panel 200. In other words, the shock absorbing member 410 may be disposed between the support member 500 and the display panel 200. The shock absorbing member 410 may protect the display panel 200 from external impact. In addition, the shock absorbing member 410 may include a flexible material so that the display panel 200 may be easily folded. For example, the shock absorbing member 410 may include a material in the form of a foam such as a polyurethane foam, a polystyrene foam, or the like.

The second adhesive member 415 may be disposed between the shock absorbing member 410 and the support member 500. The top surface of the second adhesive member 415 may be in direct contact with the shock absorbing member 410, and the bottom surface of the second adhesive member 415 may be in direct contact with the support member 500. In addition, the second adhesive member 415 may cover the openings 520. The second adhesive member 415 may adhere to the shock absorbing member 410 onto a top surface of the support member 500. In the exemplary embodiments, the second adhesive member 415 may not be disposed inside each of the openings 535 so that the openings 520 may be configured as empty spaces. The second adhesive member 415 may include an OCA, a PSA, a photocurable resin, a thermosetting resin, or the like.

The lower protective film 300 may be disposed on the bottom surface of the display panel 200. In other words, the lower protective film 300 may be disposed between the display panel 200 and the shock absorbing member 410. The lower protective film 300 may include a PET, PEN, PP, PC, PS, PSul, PE, PPA, PES, PAR, PCO, MPPO, and the like.

The third adhesive member 205 may be disposed between the shock absorbing member 410 and the lower protective film 300. A top surface of the third adhesive member 205 may be in direct contact with the lower protective film 300, and a bottom surface of the third adhesive member 205 may be in direct contact with the shock absorbing member 410. In addition, the third adhesive member 205 may include an OCA, a PSA, a photocurable resin, a thermosetting resin, or the like.

The fourth adhesive member 305 may be disposed between the lower protective film 300 and the display panel 200. A top surface of the fourth adhesive member 305 may be in direct contact with the display panel 200, and a bottom surface of the fourth adhesive member 305 may be in direct contact with the lower protective film 300. In addition, the fourth adhesive member 305 may include an OCA, a PSA, a photocurable resin, a thermosetting resin, or the like.

A polarizing structure may be disposed on the display panel 200. The polarizing structure may block external light incident to the display panel 200 from outside. For example, the polarizing structure may include a linear polarizing film and a λ/4 phase retardation film. The λ/4 phase retardation film may be disposed on the display panel 200. The λ/4 phase retardation film may convert a phase of light. For example, the λ/4 phase retardation film may convert vertically oscillating light or horizontally oscillating light into right circular polarization light or left circular polarization light, and may convert the right circular polarization light or the left circular polarization light into the vertically oscillating light or the horizontally oscillating light. The λ/4 phase retardation film may include a birefringent film including a polymer, an alignment film formed of a liquid crystal polymer, a film including an alignment layer formed of a liquid crystal polymer, and the like.

The linear polarizing film may be disposed on the λ/4 phase retardation film. The linear polarizing film may selectively transmit light. For example, the linear polarizing film may transmit the vertically oscillating light or the horizontally oscillating light. In this case, the linear polarizing film may have a horizontal line pattern or a vertical line pattern. When the linear polarizing film includes the horizontal line pattern, the linear polarizing film may block the vertically oscillating light, and may transmit the horizontally oscillating light. When the linear polarizing film has the vertical line pattern, the linear polarizing film may block the horizontally oscillating light, and may transmit the vertically oscillating light. The light transmitted through the linear polarizing film may pass through the λ/4 phase retardation film. As described above, the λ/4 phase retardation film may convert the phase of light. For example, when the vertically and horizontally oscillating lights pass through the linear polarizing film, the linear polarizing film having the horizontal line pattern may transmit the horizontally oscillating light. When the horizontally oscillating light passes through the λ/4 phase retardation film, the horizontally oscillating light may be converted into the left circular polarization light. The left circular polarization light may be reflected by an upper electrode 340 of FIG. 5, and the light may be converted into the right circular polarization light. When the right circular polarization light passes through the λ/4 phase retardation film, the light may be converted into the vertically oscillating light. In this case, the vertically oscillating light may not be transmitted through the linear polarizing film having the horizontal line pattern. Accordingly, the light may be extinguished by the linear polarizing film and the λ/4 phase retardation film. For example, the linear polarizing film may include an iodine-based material, a dye-containing material, a polyene-based material, and the like. In other exemplary embodiments, a sensing structure may be disposed on or under the polarizing structure. For example, the sensing structure may be substantially transparent, and the light emitted from the display panel 200 may be visually recognized by a user of the display device 100 through the sensing structure. The sensing structure may include sensing electrodes. The sensing structure may detect a portion of a body of the user, an object, or the like located in front of the display device 100 through the sensing electrode.

The window member 480 may be disposed on the display panel 200. The window member 480 may protect a polarizing structure, the display panel 200, and the like. The window member 480 may include a tempered glass, a tempered plastic, and the like.

The fifth adhesive member 485 may be disposed between the window member 480 and the display panel 200. A top surface of the fifth adhesive member 485 may be in direct contact with the window member 480, and a bottom surface of the fifth adhesive member 485 may be in direct contact with the display panel 200. In addition, the fifth adhesive member 485 may include an OCA, a PSA, a photocurable resin, a thermosetting resin, or the like.

The protective film 490 may be disposed on the window member 480. For example, the protective film 490 may include an anti-finger coating layer. The protective film 490 may include a PET, PEN, PP, PC, PS, PSul, PE, PPA, PES, PAR, PCO, MPPO, and the like, which contain a fluorine (F)-based material.

The display device 100 according to this exemplary embodiment of the invention includes the support member 500 having the support patterns 530 inclined at the predetermined angle θ, so that when the display device 100 is unfolded, the shapes of the support patterns 530 may not be visually recognized on the first surface S1 of the display panel 200.

Figure 5:
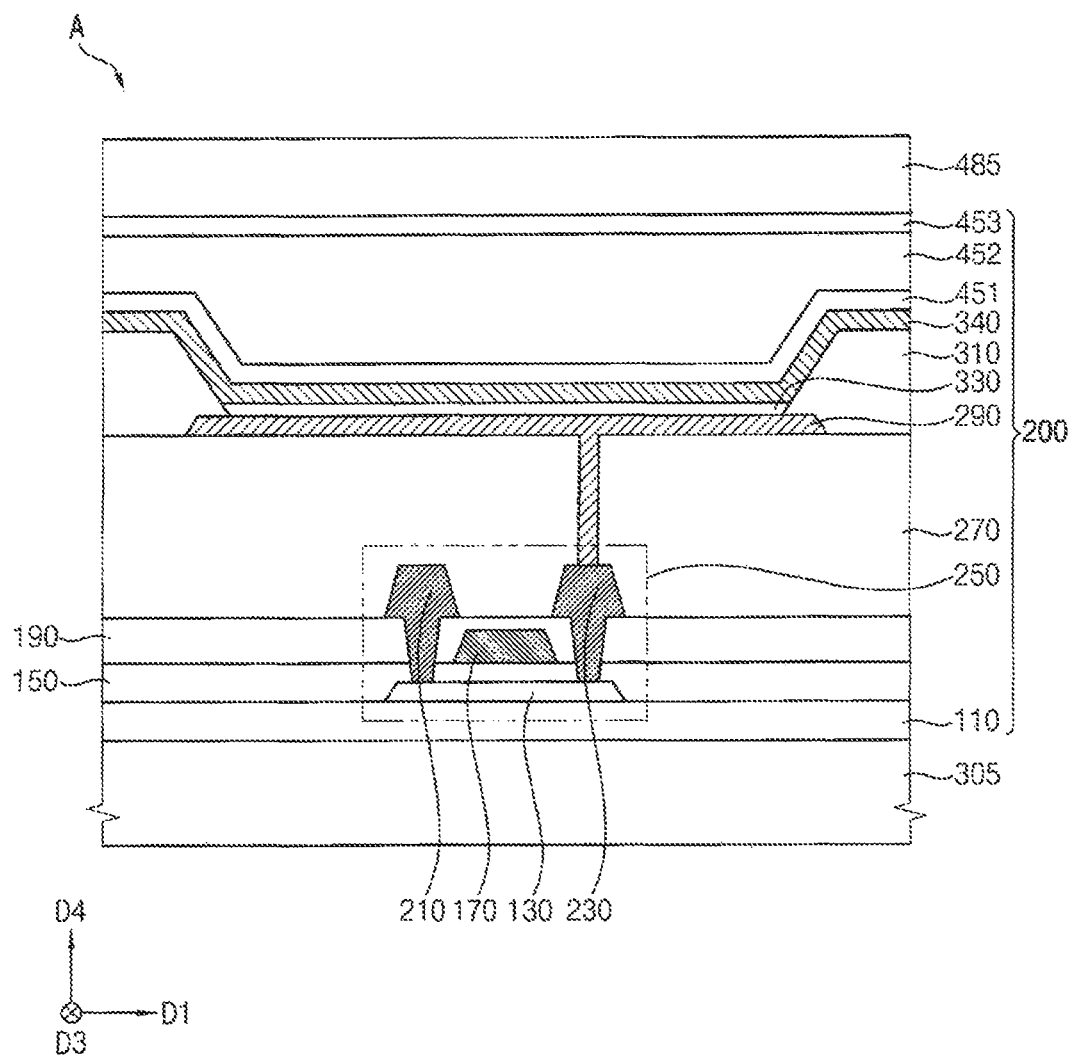
FIG. 5 is an enlarged cross sectional view of area 'A' of the display device of FIG. 3.

FIG. 5 is an enlarged cross sectional view of area 'A' of the display device of FIG. 3.

Referring to FIG. 5, the display panel 200 may include a substrate 110, a semiconductor element 250, a planarization layer 270, a lower electrode 290, a pixel defining layer 310, a light emitting layer 330, an upper electrode 340, a first inorganic thin film encapsulation layer 451, an organic thin film encapsulation layer 452, a second inorganic thin film encapsulation layer 453, and the like. The semiconductor element 250 may include an active layer 130, a gate insulating layer 150, a gate electrode 170, an insulating interlayer 190, a source electrode 210, and a drain electrode 230.

The substrate 110 including a transparent or an opaque material may be provided. In some exemplary embodiments, the display panel 200 has a generally polygonal shape when viewed in a plan view, so that the substrate 110 may also have a generally polygonal shape when viewed in a plan view.

The substrate 110 may be disposed on the fourth adhesive member 305. The substrate 110 may be formed from a transparent resin substrate. Examples of the transparent resin substrate that may be used as the substrate 110 include a polyimide substrate. In this case, the polyimide substrate may include a first polyimide layer, a barrier film layer, a second polyimide layer, and the like. In other exemplary embodiments, the substrate 110 may include a quartz substrate, a synthetic quartz substrate, a calcium fluoride substrate, a fluorine-doped quartz substrate (F-doped quartz substrate), a soda lime glass substrate, a non-alkali glass substrate, etc.

A buffer layer may be disposed on the substrate 110. The buffer layer may prevent metal atoms or impurities from diffusing from the substrate 110 to the semiconductor element 250, and may control a heat transfer rate during a crystallization process for forming the active layer to obtain a substantially uniform active layer. In addition, when a surface of the substrate 110 is not uniform, the buffer layer may serve to improve flatness of the surface of the substrate 110. Depending on the type of substrate 110, at least two buffer layers may be provided on the substrate 110, or the buffer layer may not be provided. For example, the buffer layer may include an organic material or an inorganic material.

The active layer 130 may be disposed on the substrate 110. The active layer 130 may include a metal oxide semiconductor, an inorganic semiconductor (e.g., an amorphous silicon or a poly silicon semiconductor), an organic semiconductor, etc. The active layer 130 may have source and drain regions.

The gate insulating layer 150 may be disposed on the active layer 130. For example, the gate insulating layer 150 may sufficiently cover the active layer 130 on the substrate 110, and may have a substantially flat top surface without creating a step around the active layer 130. In some exemplary embodiments, the gate insulating layer 150 may be disposed along a profile of the active layer 130 with a uniform thickness to cover the active layer 130 on the substrate 110. The gate insulating layer 150 may include a silicon compound, a metal oxide, etc. For example, the gate insulating layer 150 may include a silicon oxide ($SiO_x$), a silicon nitride ($SiN_x$), a silicon oxynitride ($SiO_xN_y$), a silicon oxycarbide ($SiO_xC_y$), a silicon carbonitride ($SiC_xN_y$), an aluminum oxide ($AlO_x$), an aluminum nitride ($AlN_x$), a tantalum oxide (TaO$_x$), a hafnium oxide (HfO$_x$), a zirconium oxide (ZrO$_x$), a titanium oxide (TiO$_x$), etc. In other exemplary embodiments, the gate insulating layer 150 may have a multilayer structure including a plurality of insulating layers. For example, the insulating layers may have mutually different thicknesses or may include mutually different materials.

The gate electrode 170 may be disposed on the gate insulating layer 150. The gate electrode 170 may be disposed at a portion of the gate insulating layer 150 under which the active layer 130 is located. The gate electrode 170 may include a metal, an alloy, a metal nitride, a conductive metal oxide, a transparent conductive material, etc. For example, the gate electrode 170 may include Au, Ag, Al, W, Cu, Pt, Ni, Ti, Pd, Mg, Ca, Li, Cr, Ta, Mo, Sc, Nd, Ir, an aluminum-containing alloy, an AlN$_x$, a silver-containing alloy, a WN$_x$, a copper-containing alloy, a molybdenum-containing alloy, a TiN$_x$, a CrN$_x$, a TaN$_x$, a SrRu$_x$O$_y$, a ZnO$_x$, an ITO, a SnO$_x$, an InO$_x$, a GaO$_x$, an IZO, etc. These may be used alone or in combination with each other. In other exemplary embodiments, the gate electrode 170 may have a multilayer structure including a plurality of metal layers. For example, the metal layers may have mutually different thicknesses or may include mutually different materials.

The insulating interlayer 190 may be disposed on the gate electrode 170. The insulating interlayer 190 may sufficiently cover the gate electrode 170 on the gate insulating layer 150, and may have a substantially flat top surface without creating a step around the gate electrode 170. In some exemplary embodiments, the insulating interlayer 190 may be disposed along a profile of the gate electrode 170 with a uniform thickness to cover the gate electrode 170 on the gate insulating layer 150. The insulating interlayer 190 may include a silicon compound, a metal oxide, etc. In some exemplary embodiments, the insulating interlayer 190 may have a multilayer structure including a plurality of insulating layers. For example, the insulating layers may have mutually different thicknesses or may include mutually different materials.

The source electrode 210 and the drain electrode 230 may be disposed on the insulating interlayer 190. The source electrode 210 may be connected to the source region of the active layer 130 through a contact hole formed by removing first parts of the gate insulating layer 150 and the insulating interlayer 190, and the drain electrode 230 may be connected to the drain region of the active layer 130 through a contact hole formed by removing second parts of the gate insulating layer 150 and the insulating interlayer 190. Each of the source electrode 210 and the drain electrode 230 may include a metal, an alloy, a metal nitride, a conductive metal oxide, a transparent conductive material, etc. These may be used alone or in combination with each other. In other exemplary embodiments, each of the source electrode 210 and the drain electrode 230 may have a multilayer structure including a plurality of metal layers. For example, the metal layers may have mutually different thicknesses or may include mutually different materials.

Accordingly, the semiconductor element 250 including the active layer 130, the gate insulating layer 150, the gate electrode 170, the insulating interlayer 190, the source electrode 210, and the drain electrode 230 may be provided.

Although the semiconductor element 250 has been described as having a top gate structure, the exemplary embodiments are not limited thereto. For example, the semiconductor element 250 may have a bottom gate structure, a double gate structure, etc.

In addition, although the display device 100 has been described as including one semiconductor element, the exemplary embodiments are not limited thereto. For example, the display device 100 may include at least one semiconductor element and at least one storage capacitor.

The planarization layer 270 may be disposed on the insulating interlayer 190, the source electrode 210, and the drain electrode 230. For example, the planarization layer 270 may be relatively thick. In this case, the planarization layer 270 may have a substantially flat top surface. In order to implement the flat top surface of the planarization layer 270, a planarization process may be additionally performed on the planarization layer 270. In some exemplary embodiments, the planarization layer 270 may be disposed along a profile of the source electrode 210 and the drain electrode 230 with a uniform thickness on the insulating interlayer 190. The planarization layer 270 may be formed of an organic material or an inorganic material. In some exemplary embodiments, the planarization layer 270 may include an organic material. For example, the planarization layer 270 may include a photoresist, a polyacryl-based resin, a polyimide-based resin, a polyamide-based resin, a siloxane-based resin, an acryl-based resin, an epoxy-based resin, etc.

The lower electrode 290 may be disposed on the planarization layer 270. The lower electrode 290 may be connected to the drain electrode 230 through a contact hole formed by removing a portion of the planarization layer 270, and the lower electrode 290 may be electrically connected to the semiconductor element 250. The lower electrode 290 may include a metal, an alloy, a metal nitride, a conductive metal oxide, a transparent conductive material, etc. These may be used alone or in combination with each other. In other exemplary embodiments, the lower electrode 290 may have a multilayer structure including a plurality of metal layers. For example, the metal layers may have mutually different thicknesses or may include mutually different materials.

The pixel defining layer 310 may be disposed on the planarization layer 270. For example, the pixel defining layer 310 may expose a portion of a top surface of the lower electrode 290 while covering both sides of the lower electrode 290. The pixel defining layer 310 may be formed of an organic material or an inorganic material. In some exemplary embodiments, the pixel defining layer 310 may include an organic material.

The light emitting layer 330 may be disposed on the pixel defining layer 310 and the lower electrode 290. The light emitting layer 330 may be formed by using at least one of light emitting materials for emitting different color lights (i.e., red light, green light, blue light, etc.) according to sub-pixels. Alternatively, the light emitting layer 330 may be formed by laminating a plurality of light emitting materials for emitting different color lights such as red light, green light, and blue light to emit white light as a whole. In this case, a color filter may be disposed on the light emitting layer 330 which is disposed on the lower electrode 290. The color filter may include at least one of a red color filter, a green color filter, and a blue color filter. In some exemplary embodiments, the color filter may include a yellow color filter, a cyan color filter, and a magenta color filter. The color filter may include a photosensitive resin or a color photoresist.

The upper electrode 340 may be disposed on the light emitting layer 330 and the pixel defining layer 310. The upper electrode 340 may include a metal, an alloy, a metal nitride, a conductive metal oxide, a transparent conductive material, etc. These may be used alone or in combination with each other. In other exemplary embodiments, the upper electrode 340 may have a multilayer structure including a plurality of metal layers. For example, the metal layers may have mutually different thicknesses or may include mutually different materials.

The first inorganic thin film encapsulation layer 451 may be disposed on the upper electrode 340. The first inorganic thin film encapsulation layer 451 may be disposed along a profile of the upper electrode 340 with a uniform thickness to cover the upper electrode 340. The first inorganic thin film encapsulation layer 451 may prevent the light emitting layer 330 from being deteriorated due to penetration of moisture, oxygen, or the like. In addition, the first inorganic thin film encapsulation layer 451 may function to protect the display panel 200 from external impact. The first inorganic thin film encapsulation layer 451 may include inorganic materials having flexibility.

The organic thin film encapsulation layer 452 may be disposed on the first inorganic thin film encapsulation layer 451. The organic thin film encapsulation layer 452 may improve flatness of the display panel 200 and protect the display panel 200. The organic thin film encapsulation layer 452 may include organic materials having flexibility.

The second inorganic thin film encapsulation layer 453 may be disposed on the organic thin film encapsulation layer 452. The second inorganic thin film encapsulation layer 453 may be disposed along a profile of the organic thin film encapsulation layer 452 with a uniform thickness to cover the organic thin film encapsulation layer 452. The second inorganic thin film encapsulation layer 453 may prevent the light emitting layer 330 from being deteriorated due to the penetration of moisture, oxygen, or the like together with the first inorganic thin film encapsulation layer 451. In addition, the second inorganic thin film encapsulation layer 453 may function to protect the display panel 200 from external impact together with the first inorganic thin film encapsulation layer 451 and the organic thin film encapsulation layer 452. The second inorganic thin film encapsulation layer 453 may include inorganic materials having flexibility.

Accordingly, the display panel 200 including the substrate 110, the semiconductor element 250, the planarization layer 270, the lower electrode 290, the pixel defining layer 310, the light emitting layer 330, the upper electrode 340, the first inorganic thin film encapsulation layer 451, the organic thin film encapsulation layer 452, and the second inorganic thin film encapsulation layer 453 may be provided.

Although the display device 100 of some exemplary embodiments has been described as being an organic light emitting diode display device, the exemplary embodiments are not limited thereto. For example, in other exemplary embodiments, the display device 100 may include a liquid crystal display device (LCD), a field emission display device (FED), a plasma display device (PDP), or an electrophoretic image display device (EPD).

Figure 6:
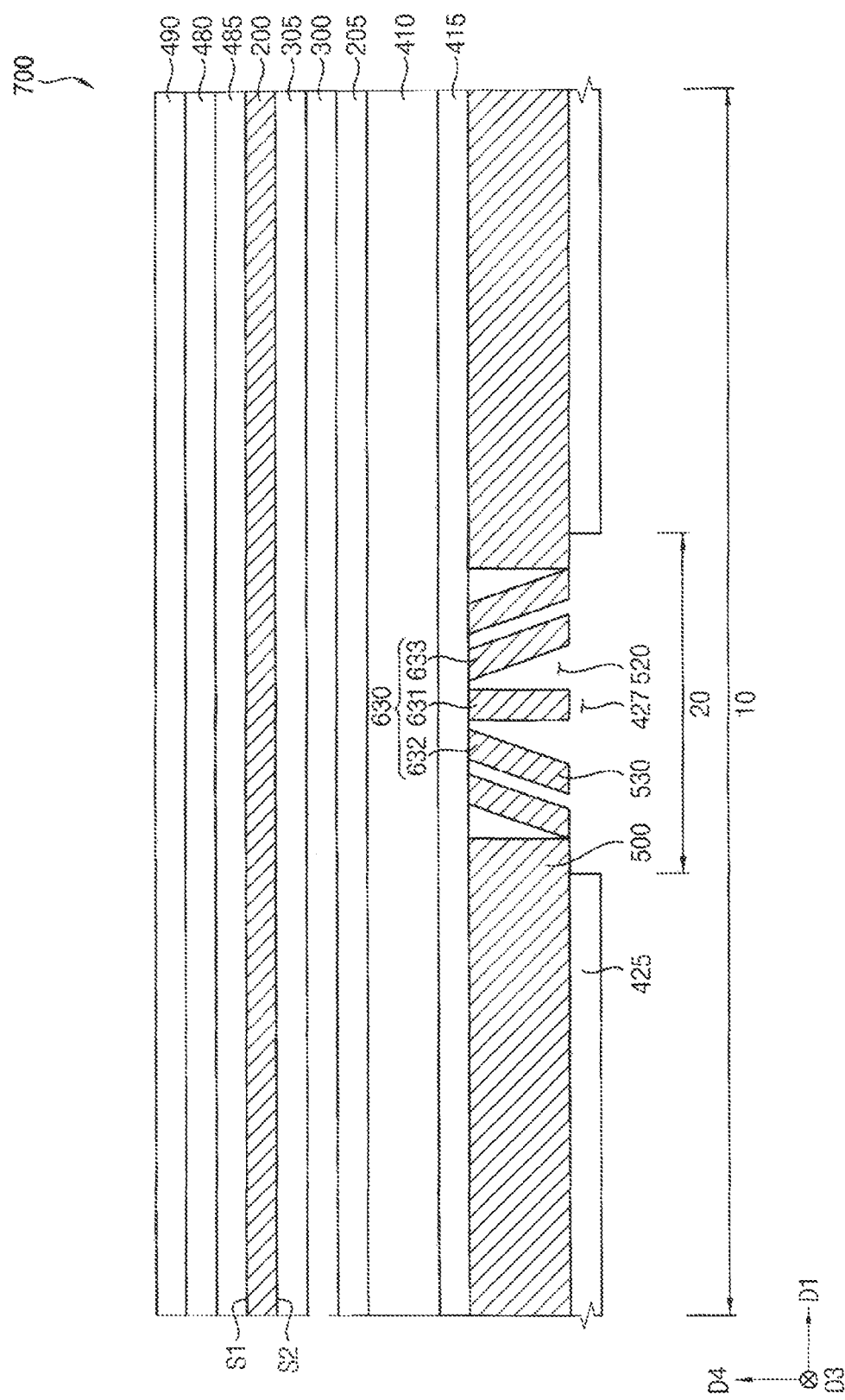
FIG. 6 is a cross-sectional view of another exemplary embodiment of a display device constructed according to principles of the invention in an unfolded position.

FIG. 6 is a cross-sectional view of another exemplary embodiment of a display device constructed according to principles of the invention in an unfolded position.

A display device 700 illustrated in FIG. 6 may have a configuration substantially identical or similar to the configuration of the display device 100 described with reference to FIGS. 1 to 5 except for support patterns 630. In FIG. 6, redundant descriptions of components substantially identical or similar to the components described with reference to FIGS. 1 to 5 may be omitted to avoid redundancy. For example, FIG. 6 shows a position in which the display device 700 is unfolded.

Referring to FIG. 6, the display device 700 may include the display panel 200, the shock absorbing member 410, the support member 500, the lower protective film 300, the window member 480, the protective film 490, the first adhesive member 425, the second adhesive member 415, the third adhesive member 205, the fourth adhesive member 305, the fifth adhesive member 485, and the like.

The support member 500 may include a plurality of support patterns 630 disposed in the folding area 20. The support patterns 630 may be spaced apart from each other. In this case, openings 520 of the support member 500 may be defined by spaces between the support patterns 630. Furthermore, the first adhesive member 425 may have the opening 427 which overlaps the folding area 20.

The support member 500 may be disposed on the bottom surface of the display panel 200. In other words, the support member 500 may be disposed on the second surface S2 of the display panel 200, and may include the plurality of support patterns 630 formed in the folding area 20. In some exemplary embodiments, the support patterns 630 may be spaced apart from each other in the first direction D1, which is generally parallel to the top surface S1 of the display panel 200, in the folding area 20. In addition, the support patterns 630 may extend in the second direction D2 or the third direction D3, which is generally perpendicular to the first direction D1.

Similarly as shown in FIG. 4 for the support patterns 530, each of the support patterns 630 may include the first side surface 530$b$, the top surface 530$a$ adjacent to the first portion 532$b$ of the first side surface 530$b$, the bottom surface 530$c$ adjacent to the second portion 532$d$ opposite to the first portion 532$b$ of the first side surface 530$b$, and the second side surface 530$d$ facing the first side surface 530$b$.

Referring again to FIG. 6, the support patterns 630 may include a reference support pattern 631, inclination support patterns 632, and reverse inclination support patterns 633. The reference support pattern 631 may be disposed generally in the middle of the support patterns 630, each of the inclination support patterns 632 may be inclined at a first angle on a first side surface 530$b$ of the reference support pattern 631 while being spaced apart from each other, and each of the reverse inclination support patterns 633 may be inclined at a second angle, which is different from the first angle, on the second side surface 530$d$ of the reference support pattern 631 while being spaced apart from each other. In other words, the inclination support patterns 632 and the reverse inclination support patterns 633 may be generally symmetrical to each other based on the reference support pattern 631.

For example, the support patterns 630 may include first to $n^{th}$ support patterns 630 (where n is an integer of 1 or more) arranged in the first direction D1, and each of the first to $n^{th}$ support patterns 630 may include the first side surface 530$b$, the top surface 530$a$, the bottom surface 530$c$, and the second side surface 530$d$. Among the first to $n^{th}$ support patterns 630, a $k^{th}$ support pattern 630 (where k is an integer between 1 and n) may be defined as the reference support pattern 631, first to $(k-1)^{th}$ support patterns 630 may be defined as the inclination support patterns 632 inclined at the first angle on the first side surface 530$b$ of the reference support pattern 631, and $(k+1)^{th}$ to $n^{th}$ support patterns 630 may be defined as the reverse inclination support patterns 633 inclined at the second angle, which is different from the first angle, on the second side surface 530$d$ of the reference support pattern 631. In addition, the first to $(k-1)^{th}$ support patterns 630 and the $(k+1)^{th}$ to $n^{th}$ support patterns 630 may be generally symmetrical to each other based on the $k^{th}$ support pattern 630.

For example, a support member included in a conventional display device may include support patterns which are inclined at a predetermined angle (e.g., an angle inclined from the fourth direction D4) based on a reference support pattern so as not to be symmetrically disposed (e.g., so as to be disposed at an angle corresponding to the fourth direction D4), and the support patterns may be spaced apart from each other in the first direction D1. An opening of the support member may be defined by a space between the support patterns. When the conventional display device is folded or unfolded, the opening may be contracted or extended. In the conventional display device, a range of contraction and extension of the opening defined by a top surface of each of the support patterns may be relatively large, and the support member located in the folding area may be subject to a relatively large stress. Accordingly, the support patterns of the support member may be easily broken.

In some exemplary embodiments, the display device 700 may include the support patterns 630 including the reference support pattern 631, the inclination support patterns 632 inclined at the first angle, and the reverse inclination support patterns 633 inclined at the second angle. The inclination support patterns 632 and the reverse inclination support patterns 633 are symmetrically disposed, so that the bottom surface of the second adhesive member 415 may not be exposed through the openings 520 of the support member 500, and the external light may not penetrate in the direction D4. Accordingly, when the display device 700 is unfolded, shapes of the support patterns 630 may not be visually recognized on the first surface S1 of the display panel 200.

In addition, the inclination support patterns 632 and the reverse inclination support patterns 633 are symmetrically disposed, so that when the display device 700 is folded or unfolded, a range of contraction and extension of each of the openings 520 defined by the top surface 530a of each of the inclination support patterns 632 and the reverse inclination support patterns 633 may be relatively reduced, and the support member 500 located in the folding area 20 may be subject to a relatively small stress. Accordingly, the support member 500 may not be easily broken.

Figure 7:
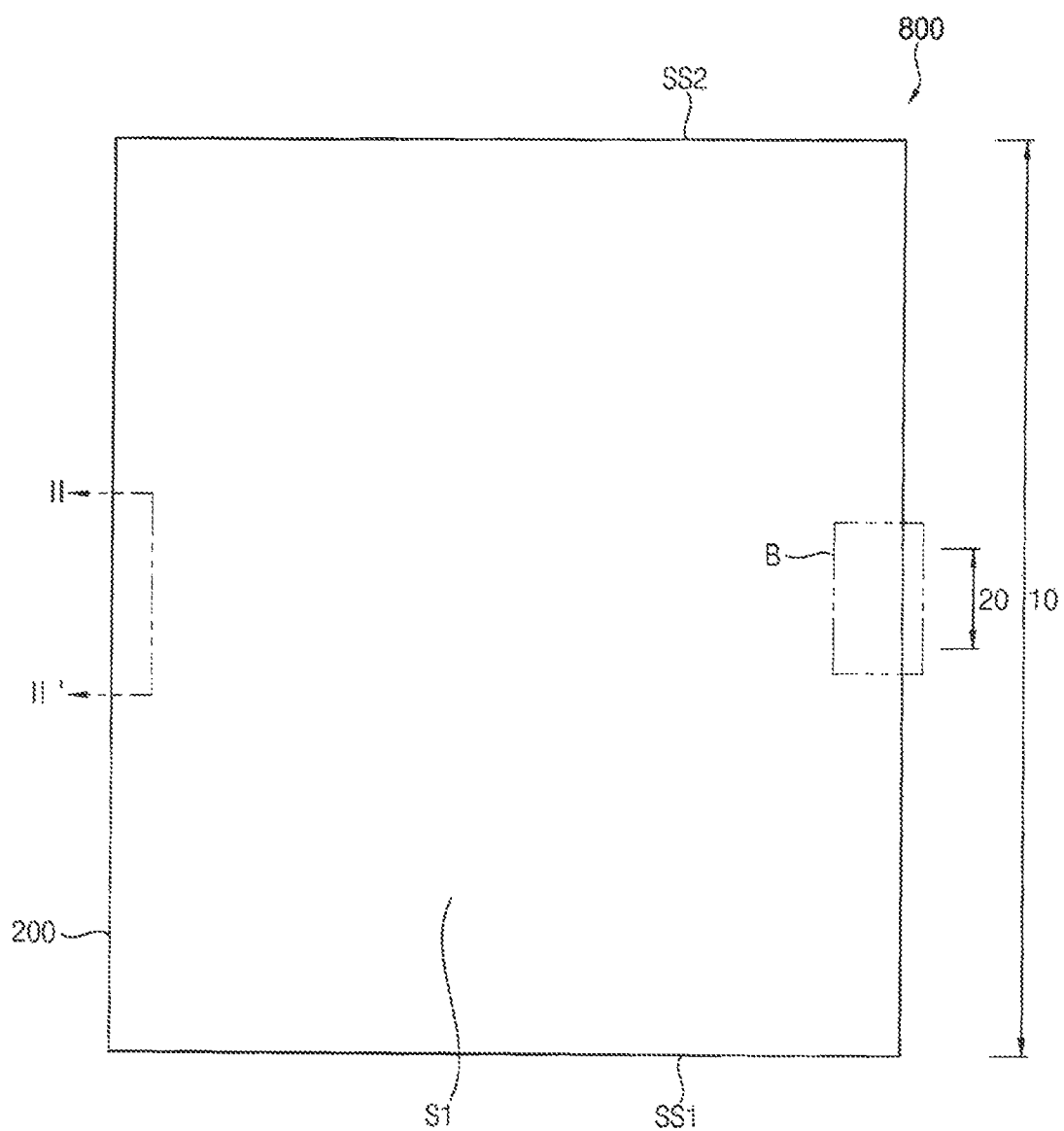
FIG. 7 is a plan view of another exemplary display device constructed according to principles of the invention in an unfolded position.
Figure 8:
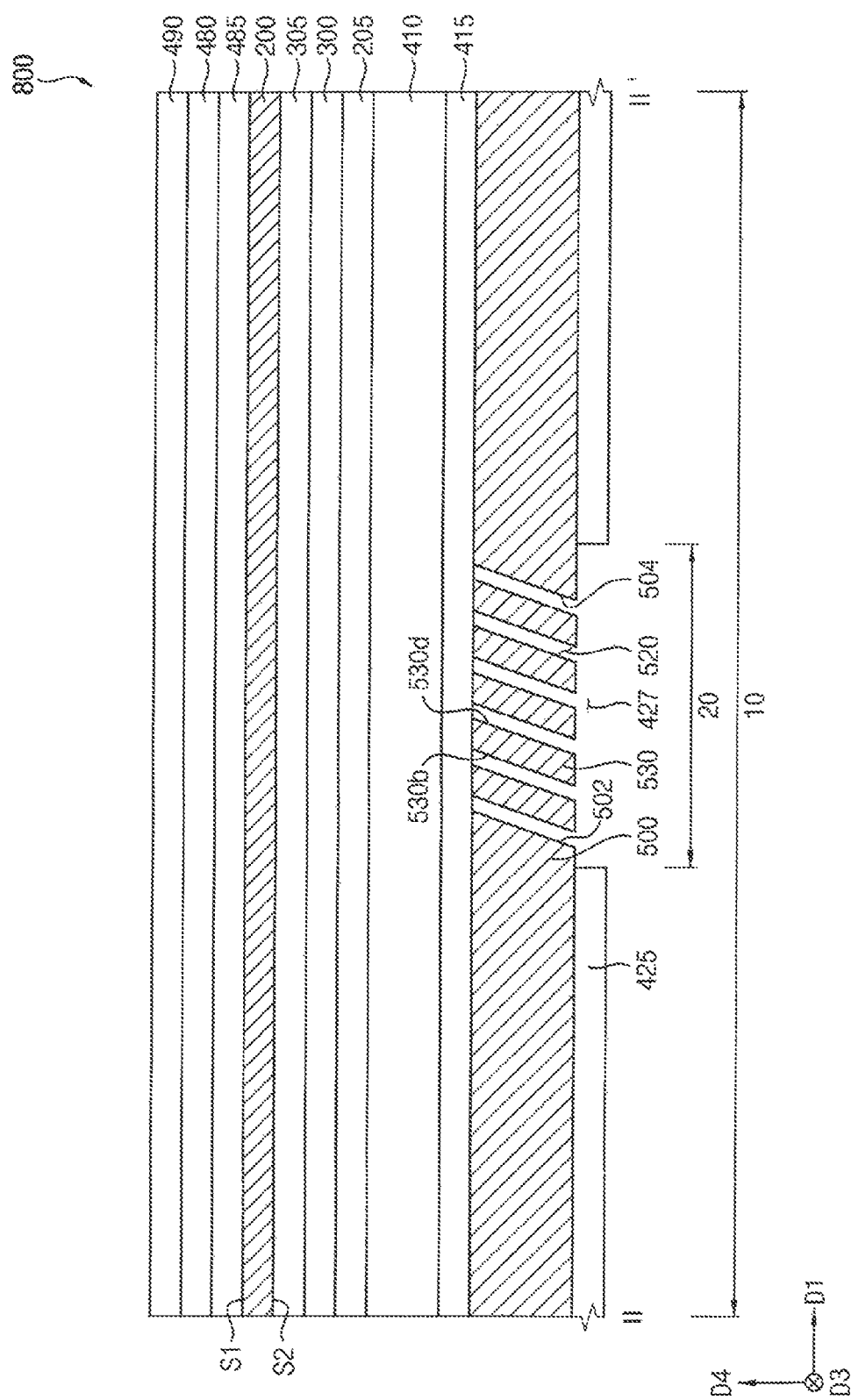
FIG. 8 is a cross-sectional view taken along line II-IF of FIG. 7.
Figure 9:
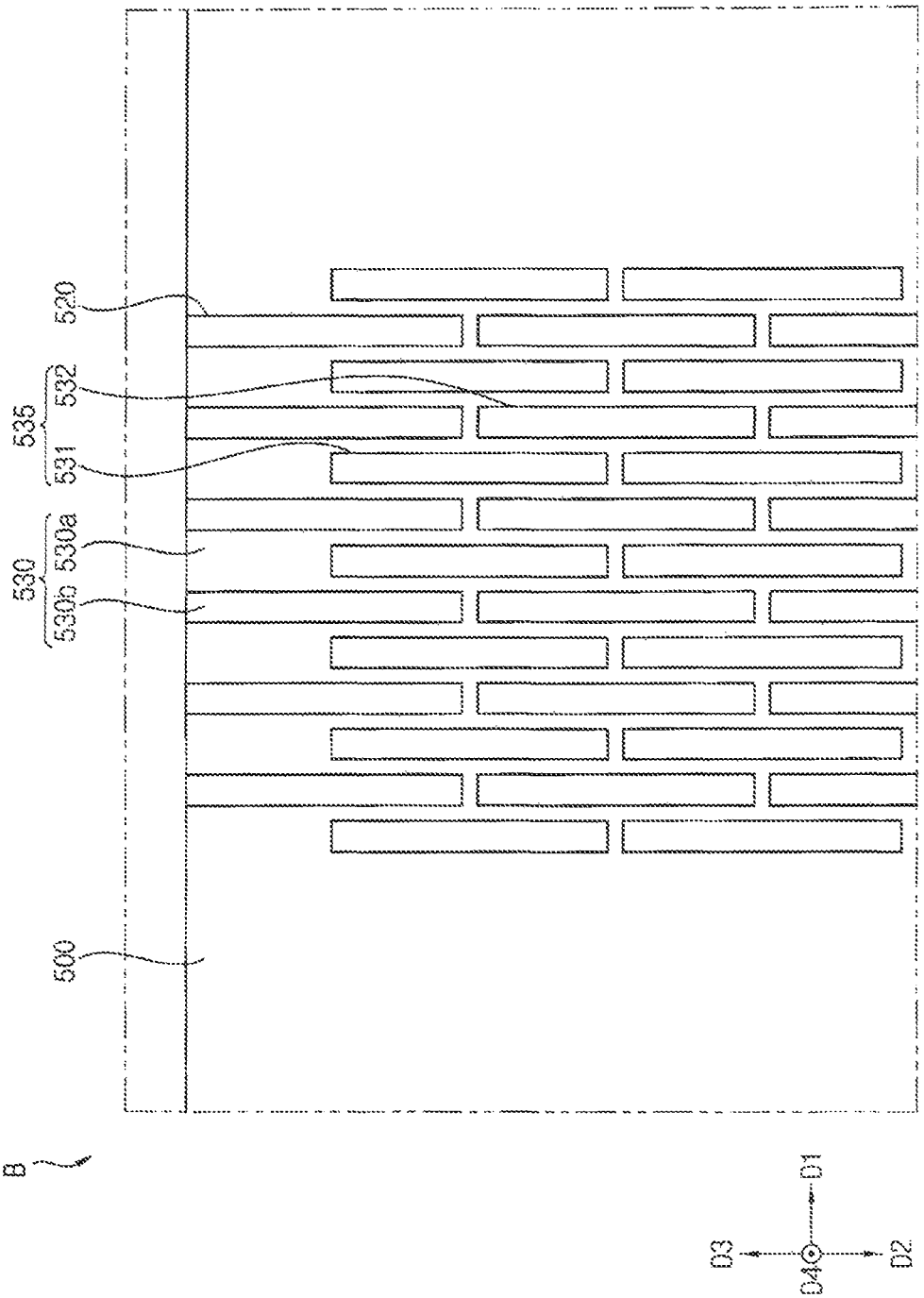
FIG. 9 is an enlarged view of area 'B' of the display device of FIG. 7.

FIG. 7 is a plan view of another exemplary display device constructed according to principles of the invention in an unfolded position. FIG. 8 is a cross-sectional view taken along line II-II' of FIG. 7. FIG. 9 is an enlarged view of area 'B' of the display device of FIG. 7.

A display device 800 illustrated in FIGS. 7 to 9 may have a configuration substantially identical or similar to the configuration of the display device 100 described with reference to FIGS. 1 to 5 except for the shape of the support member 500. In FIGS. 7 to 9, redundant descriptions of components substantially identical or similar to the components described with reference to FIGS. 1 to 5 may be omitted to avoid redundancy. For example, FIGS. 7 to 9 show a position in which the display device 800 is unfolded.

Referring to FIGS. 7, 8, and 9, the display device 800 may include the display panel 200, the shock absorbing member 410, the support member 500, the lower protective film 300, the window member 480, the protective film 490, the first adhesive member 425, the second adhesive member 415, the third adhesive member 205, the fourth adhesive member 305, the fifth adhesive member 485, and the like. In this case, as shown in FIG. 9, a plurality of openings 535, a plurality of support patterns 530, and a plurality of trenches 520 may be formed in the support member 500.

The support member 500 may be disposed on the bottom surface of the shock absorbing member 410. In other words, the support member 500 may be disposed on the second surface S2 of the display panel 200, and may include the plurality of openings 535 formed in the folding area 20.

In some exemplary embodiments, as shown in FIG. 9, the openings 535 may include openings 531 arranged in the first direction D1 and openings 532 shifted laterally in the second direction D2 and arranged in the first direction D1. In addition, the support member 500 may further include the plurality of support patterns 530 protruding in the third direction D3 opposite to the second direction D2. The support patterns 530 may be spaced apart from each other in the first direction D1 in the folding area 20, and may be inclined at a predetermined angle θ. In addition, the support patterns 530 may extend in the second direction D2 or the third direction D3 perpendicular to the first direction D1. Furthermore, the trench 520 may be defined by a space between two adjacent support patterns 530. The first side surface 530b of each of the support patterns 530 may be viewed through the trench 520. In other words, the trench 520 and the first side surface 530b of each of the support patterns 530 may overlap with each other in the fourth direction D4.

As shown in FIG. 4, each of the support patterns 530 may include the first side surface 530b, the top surface 530a adjacent to the first portion 532b of the first side surface 530b, the bottom surface 530c adjacent to the second portion 532d opposite to the first portion 532b of the first side surface 530b, and the second side surface 530d facing the first side surface 530b. The top surface 530a of the first support pattern 530 and the bottom surface 530c of the second support pattern 530, in which the first and second support patterns 530 correspond to two adjacent support patterns 530 among the support patterns 530, may overlap each other in the fourth direction D4, and the overlapping portion may be defined as the overlapping region OR. When the bottom surface 530c of the second support pattern 530 overlaps the portion 532b of the first side surface 530b and the top surface 530a of the first support pattern 530, the overlapping region OR may be relatively increased.

For example, the support patterns 530 may include first to $n^{th}$ support patterns 530 (where n is an integer of 1 or more) arranged in the first direction D1, each of the first to $n^{th}$ support patterns 530 may include the first side surface 530b, the top surface 530a, the bottom surface 530c, and the second side surface 530d, and the top surface 530a of a $k^{th}$ support pattern 530 (where k is an integer between 1 and n) and the bottom surface 530c of a $(k+1)^{th}$ support pattern 530 among the first to $n^{th}$ support patterns 530 may overlap each other. In addition, the support member 500 may include first to $m^{th}$ openings 535 (where m is an integer of 1 or more) arranged in the first direction D1, a $j^{th}$ opening (where j is an even number between 1 and m) among the first to $m^{th}$ openings 535 may be shifted in the second direction D2, and one of the support patterns 530 may be located in the third direction D3 from each of $(j-1)^{th}$ and $(j+1)^{th}$ openings 535 among the first to $m^{th}$ openings.

In some exemplary embodiments, a first inner side surface 502 of the support member 500, which is adjacent to the first side surface 530b of the first support pattern 530, may be generally parallel to the first side surface 530b of the first support pattern 530, and a second inner side surface 504 of the support member 500, which is adjacent to the second side surface 530d of the $n^{th}$ support pattern 530, may be generally parallel to the second side surface 530d of the $n^{th}$ support pattern 530.

The support patterns 530 may be inclined at a predetermined angle θ to block external light incident through an opening 427 of the first adhesive member 425. In other words, the support patterns 530 are inclined at the predetermined angle θ, so that the bottom surface of the second adhesive member 415 may not be exposed through the openings 520 of the support member 500 in the fourth direction D4.

Figure 10:
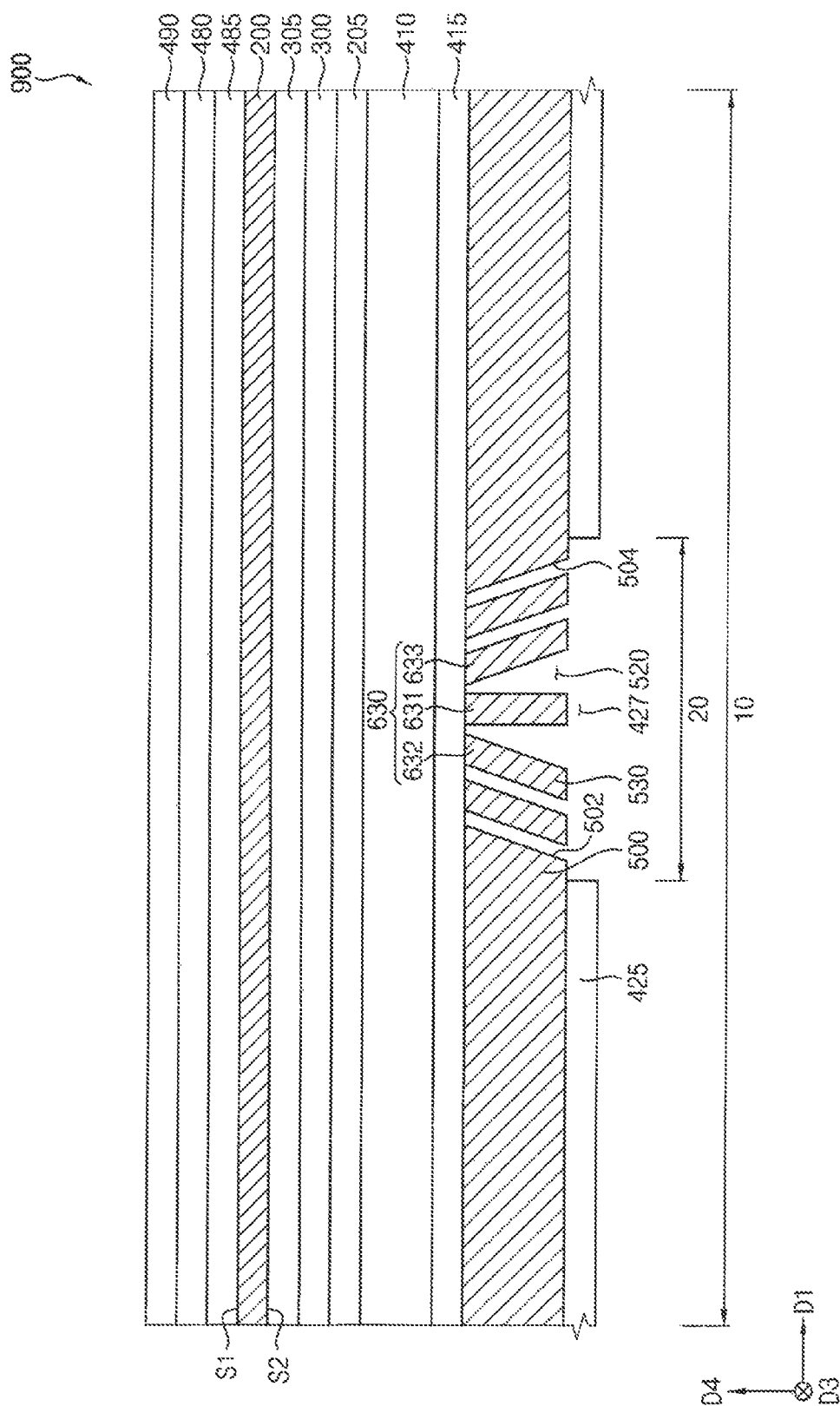
FIG. 10 is a cross-sectional view of still another exemplary embodiment of a display device constructed according to principles of the invention in an unfolded position.

FIG. 10 is a cross-sectional view of still another exemplary embodiment of a display device constructed according to principles of the invention in an unfolded position.

A display device 900 illustrated in FIG. 10 may have a configuration substantially identical or similar to the configuration of the display device 100 described with reference to FIGS. 1 to 5 except for the shape of the support member 500. In FIG. 10, redundant descriptions of components substantially identical or similar to the components described with reference to FIGS. 1 to 5 may be omitted to avoid redundancy. For example, FIG. 10 shows a position in which the display device 900 is unfolded.

Referring to FIG. 10, the display device 900 may include the display panel 200, the shock absorbing member 410, the support member 500, the lower protective film 300, the window member 480, the protective film 490, the first adhesive member 425, the second adhesive member 415, the third adhesive member 205, the fourth adhesive member 305, the fifth adhesive member 485, and the like. In this case, as shown in FIG. 9, a plurality of openings 535, a plurality of support patterns 530, and a plurality of trenches 520 may be formed in the support member 500.

The support member 500 may be disposed on the bottom surface of the shock absorbing member 410. In other words, the support member 500 may be disposed on the second surface S2 of the display panel 200, and may include the plurality of openings 535 formed in the folding area 20.

As shown in FIG. 9, the openings 535 may include openings 531 arranged in the first direction D1 and openings 532 shifted in the second direction D2 and arranged in the first direction D1. In addition, the support member 500 may further include the plurality of support patterns 630 protruding in the third direction D3 opposite to the second direction D2. The support patterns 630 may be spaced apart from each other in the first direction D1 in the folding area 20, and the support patterns 630 may extend in the second direction D2 or the third direction D3 perpendicular to the first direction D1.

As shown in FIG. 4, each of the support patterns 630 may include the first side surface 530b, the top surface 530a adjacent to the first portion 532b of the first side surface 530b, the bottom surface 530c adjacent to the second portion 532d opposite to the first portion 532b of the first side surface 530b, and the second side surface 530d facing the first side surface 530b.

Referring again to FIG. 10, the support patterns 630 may include the reference support pattern 631, inclination support patterns 632, and reverse inclination support patterns 633. The reference support pattern 631 may be disposed in the middle of the support patterns 630, each of the inclination support patterns 632 may be inclined at a first angle on the first side surface 530b of the reference support pattern 631 while being spaced apart from each other, and each of the reverse inclination support patterns 633 may be inclined at a second angle, which is different from the first angle, on the second side surface 530d of the reference support pattern 631 while being spaced apart from each other. In other words, the inclination support patterns 632 and the reverse inclination support patterns 633 may be generally symmetrical to each other based on the reference support pattern 631. Furthermore, as shown in FIG. 9, the trench 520 may be defined by a space between two adjacent support patterns 630. The first side surface 530b of each of the support patterns 630 may be viewed through the trench 520. In other words, the trench 520 and the first side surface 530b of each of the support patterns 630 may overlap with each other in the fourth direction D4.

For example, the support patterns 630 may include first to $n^{th}$ support patterns 630 (where n is an integer of 1 or more) arranged in the first direction D1, and each of the first to $n^{th}$ support patterns 630 may include the first side surface 530b, the top surface 530a, the bottom surface 530c, and the second side surface 530d. Among the first to $n^{th}$ support patterns 630, a $k^{th}$ support pattern 630 (where k is an integer between 1 and n) may be defined as the reference support pattern 631, first to $(k-1)^{th}$ support patterns 630 may be defined as the inclination support patterns 632 inclined at the first angle on the first side surface 530b of the reference support pattern 631, and $(k+1)^{th}$ to $n^{th}$ support patterns 630 may be defined as the reverse inclination support patterns 633 inclined at the second angle, which is different from the first angle, on the second side surface 530d of the reference support pattern 631. In addition, the first to $(k-1)^{th}$ support patterns 630 and the $(k+1)^{th}$ to $n^{th}$ support patterns 630 may be generally symmetrical to each other based on the $k^{th}$ support pattern 630. In addition, the support member 500 may include first to $m^{th}$ openings 535 (where m is an integer of 1 or more) arranged in the first direction D1, the $j^{th}$ opening (where j is an even number between 1 and m) among the first to $m^{th}$ openings 535 may be shifted in the second direction D2, and one of the support patterns 630 may be located in the third direction D3 from each of $(j-1)^{th}$ and $(j+1)^{th}$ openings 535 among the first to $m^{th}$ openings.

In some exemplary embodiments, the first inner side surface 502 of the support member 500, which is adjacent to the first side surface 530b of the first support pattern 630, may be generally parallel to the first side surface 530b of the first support pattern 630, and the second inner side surface 504 of the support member 500, which is adjacent to the second side surface 530d of the $n^{th}$ support pattern 630, may be generally parallel to the second side surface 530d of the $n^{th}$ support pattern 630.

The exemplary embodiments of the invention may be applied to various electronic devices including display devices. For example, some exemplary embodiments may be applied to vehicle-display devices, ship-display devices, aircraft-display devices, portable communication devices, display devices for display or for information transfer, medical-display devices, etc.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:
1. A display device comprising:
a display panel having a foldable area;
a support disposed on a bottom surface of the display panel, the support including a plurality of support patterns spaced apart from each other in the foldable area and being inclined relative to the bottom surface; and
a first adhesive member disposed on a bottom surface of the support, the first adhesive member having an open- ing overlapping the foldable area and exposing all bottom surfaces of the plurality of support patterns to the outside, wherein each of the support patterns comprises support patterns includes a first side surface, a top surface adjacent to a first portion of the first side surface, and a bottom surface adjacent to a second portion opposite to the first portion of the first side surface, and the support patterns comprise a first support pattern having a top surface and a second support pattern having a bottom surface, in which the first and second support patterns overlap two adjacent support patterns.

2. The display device of claim 1, wherein the display panel further includes a display area, and a portion of the display area is defined as the foldable area.

3. The display device of claim 1, wherein the support patterns are inclined at one or more predetermined angles to block external light incident through the opening of the first adhesive member.

4. The display device of claim 1, further comprising a flexible member disposed between the support and the display panel.

5. The display device of claim 4, wherein the flexible member comprises a shock absorbing member and further comprising a second adhesive member disposed between the shock absorbing member and the support,
wherein the second adhesive member is in direct contact with the shock absorbing member and the support.

6. The display device of claim 4, further comprising a lower protective film disposed between the flexible member and the display panel.

7. The display device of claim 6, further comprising:
a window member disposed on the display panel; and
a protective film disposed on the window member.

8. A display device comprising:
a display panel having a foldable area;
a support disposed on a bottom surface of the display panel, the support including a plurality of support patterns spaced apart from each other in the foldable area and being inclined relative to the bottom surface; and
a first adhesive member disposed on a bottom surface of the support, the first adhesive member having an opening overlapping the foldable area and exposing all bottom surfaces of the plurality of support patterns to the outside,
wherein the support comprises a support member and the support patterns formed in the support member, the support patterns including first to $n^{th}$ support patterns (where n is an integer of 1 or more) arranged in a first direction generally parallel to a top surface of the display panel,
each of the first to $n^{th}$ support patterns includes a first side surface, a top surface adjacent to a first portion of the first side surface, and a bottom surface adjacent to a second portion opposite to the first portion of the first side surface; and
the top surface of a $k^{th}$ support pattern (where k is an integer between 1 and n) and the bottom surface of a $(k+1)^{th}$ support pattern of the first to $n^{th}$ support patterns overlap each other.

9. The display device of claim 8, wherein an inner side surface of the support member adjacent to the first side surface of the first support pattern is generally parallel to the first side surface of the first support pattern.

10. The display device of claim 9, wherein the support member includes first to $m^{th}$ openings (where m is an integer of 1 or more) arranged in the first direction generally parallel to the top surface of the display panel;
a $j^{th}$ opening (where j is an even number between 1 and m) of the first to $m^{th}$ openings is shifted in a second direction generally perpendicular to the first direction; and
one of the support patterns is located in a third direction opposite to the second direction from each of $(j-1)^{th}$ and $(j+1)^{th}$ openings of the first to $m^{th}$ openings.

11. A display device comprising:
a display panel having a foldable area;
a support disposed on a bottom surface of the display panel, the support including a plurality of support patterns spaced apart from each other in the foldable area and being inclined relative to the bottom surface; and
a first adhesive member disposed on a bottom surface of the support, the first adhesive member having an opening overlapping the foldable area and exposing all bottom surfaces of the plurality of support patterns to the outside,
wherein each of the support patterns includes a first side surface, a top surface adjacent to a first portion of the first side surface, a bottom surface adjacent to a second portion opposite to the first portion of the first side surface, and a second side surface facing the first side surface, and
the support patterns include:
a first support pattern;
second support patterns inclined at a first angle relative to the first side surface of the first support pattern; and
third support patterns inclined at a second angle different from the first angle relative to the second side surface of the first support pattern.

12. The display device of claim 11, wherein the first support pattern comprises a reference support pattern, the second support patterns comprise inclination support patterns, and the third support patterns comprise reverse inclination support patterns, and the inclination support patterns and the reverse inclination support patterns are generally symmetrical to each other relative to the reference support pattern.

13. A display device comprising:
a display panel having a foldable area;
a support disposed on a bottom surface of the display panel, the support including a plurality of support patterns spaced apart from each other in the foldable area and being inclined relative to the bottom surface; and
a first adhesive member disposed on a bottom surface of the support, the first adhesive member having an opening overlapping the foldable area and exposing all bottom surfaces of the plurality of support patterns to the outside,
wherein the support comprises a support member and the support patterns formed in the support member, the support patterns including first to $n^{th}$ support patterns (where n is an integer of 1 or more) arranged in a first direction generally parallel to a top surface of the display panel,
each of the first to $n^{th}$ support patterns includes a first side surface, a top surface adjacent to a first portion of the first side surface, a bottom surface adjacent to a second portion opposite to the first portion of the first side surface, and a second side surface facing the first side surface, and a $k^{th}$ support pattern (where k is an integer between 1 and n) of the first to $n^{th}$ support patterns is defined as a reference support pattern, first to $(k-1)^{th}$ support patterns are defined as inclination support patterns inclined at a first angle on the first side surface of the reference support pattern, and $(k+1)^{th}$ to $n^{th}$ support patterns are defined as reverse inclination support patterns inclined at a second angle different from the first angle relative to the second side surface of the reference support pattern.

14. The display device of claim 13, wherein the first to $(k-1)^{th}$ support patterns and the $(k+1)^{th}$ to $n^{th}$ support patterns are generally symmetrical to each other based on the $k^{th}$ support pattern.

15. The display device of claim 13, wherein a first inner side surface of the support member adjacent to the first side surface of the first support pattern is generally parallel to the first side surface of the first support pattern, and a second inner side surface of the support member, which is adjacent to the second side surface of the $n^{th}$ support pattern and faces the first inner side surface of the support member, is generally parallel to the second side surface of the $n^{th}$ support pattern.

16. The display device of claim 15, wherein the support member includes first to $m^{th}$ openings (where m is an integer of 1 or more) arranged in the first direction generally parallel to the top surface of the display panel,
a $j^{th}$ opening (where j is an even number between 1 and m) of the first to $m^{th}$ openings is shifted in a second direction generally perpendicular to the first direction, and
one of the support patterns is located in a third direction opposite to the second direction from each of $(j-1)^{th}$ and $(j+1)^{th}$ openings of the first to $m^{th}$ openings.

* * * * *